United States Patent
Kagei

(10) Patent No.: US 9,565,348 B2
(45) Date of Patent: Feb. 7, 2017

(54) AUTOMATIC TRACKING APPARATUS

(71) Applicant: CANON KABUSHIKI KAISHA, Tokyo (JP)

(72) Inventor: Kenji Kagei, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 440 days.

(21) Appl. No.: 13/864,699

(22) Filed: Apr. 17, 2013

(65) Prior Publication Data
US 2013/0278778 A1   Oct. 24, 2013

(30) Foreign Application Priority Data

Apr. 19, 2012   (JP) ................................. 2012-095572

(51) Int. Cl.
*H04N 5/232*   (2006.01)

(52) U.S. Cl.
CPC ..................... *H04N 5/232* (2013.01)

(58) Field of Classification Search
CPC ... G06K 9/00208; G06K 9/6255; H04N 5/232
USPC ...... 348/169, 135, 143, 116, 208.11, 208.14; 382/291, 103
See application file for complete search history.

(56) References Cited

U.S. PATENT DOCUMENTS 7,907,176 B2   3/2011  Hayashi
8,711,218 B2 *  4/2014  Zehavi ........................ 348/143

FOREIGN PATENT DOCUMENTS

| JP | 2001-169170 A | 6/2001 |
| JP | 2001169170 A | 6/2001 |
| JP | 2002-171438 A | 6/2002 |
| JP | 2002171438 A | 6/2002 |
| JP | 2002-247440 A | 8/2002 |
| JP | 3611394 A | 1/2005 |
| JP | 2007-295175 A | 11/2007 |
| JP | 2007295175 A | 11/2007 |

OTHER PUBLICATIONS

Japanese Office Action issued in counterpart application No. JP2012095572, dated Oct. 1, 2015.

* cited by examiner

*Primary Examiner* — Michael Lee
*Assistant Examiner* — Jean W Desir
(74) *Attorney, Agent, or Firm* — Rossi, Kimms & McDowell LLP

(57) ABSTRACT

An automatic tracking apparatus includes: an image pickup apparatus having zoom function; camera platform driving the image pickup apparatus in at least one of pan and tilt directions, and automaically tracking an object by operating the image pickup apparatus and camera platform; unit for detecting a position of the object in picked-up image information; prohibition area setting unit for setting tracking prohibition area, according to information on the automatic tracking apparatus that includes information on the object including information on at least one of type, orientation and traveling speed of the object, or information on at least one of pan and tilt positions of the camera platform and zoom position; and controller that does not perform tracking operation in the prohibition area, and performs zooming, panning and tilting to perform the tracking operation when out of the prohibition area.

10 Claims, 14 Drawing Sheets

Ntemp = 1

Ntemp = 2

FIG. 6A
Ntemp = 1
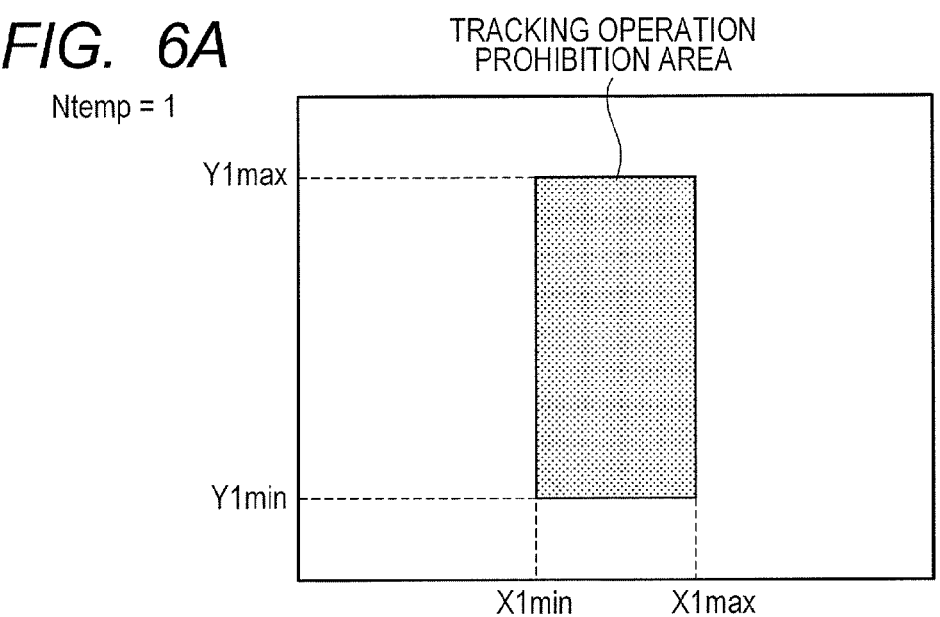
FIG. 6B
Ntemp = 2
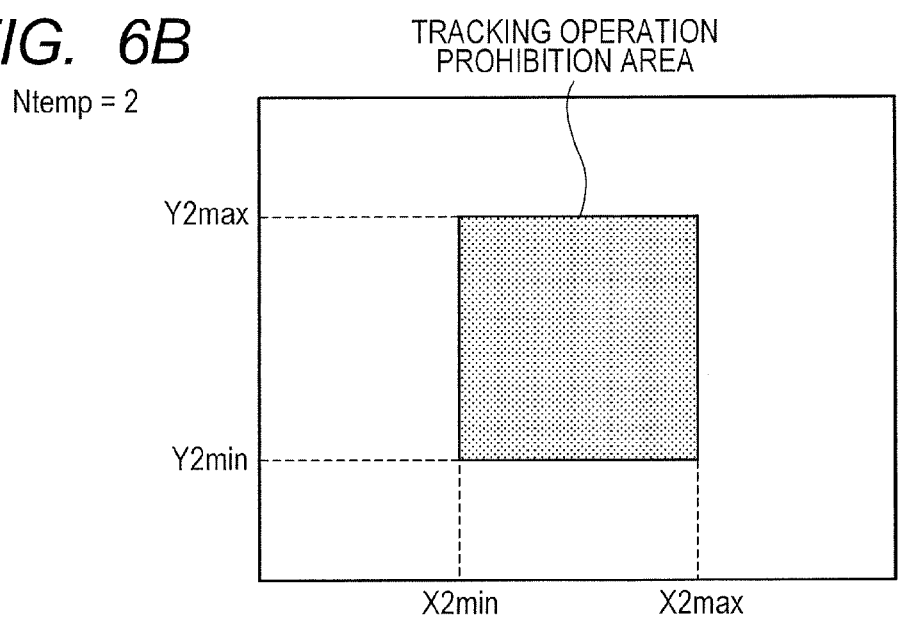
FIG. 7
| Ntemp | TRACKING OPERATION PROHIBITION AREA INFORMATION |
|---|---|
| 1 | (X1min, X1max, Y1min, Y1max) |
| 2 | (X2min, X2max, Y2min, Y2max) |

| TRACKING OPERATION PROHIBITION AREA INFORMATION | FUNCTION |
|---|---|
| Xmin | $f_{Xmin}(\theta y, \theta z)$ |
| Xmax | $f_{Xmax}(\theta y, \theta z)$ |
| Ymin | $f_{Ymin}(\theta y, \theta z)$ |
| Ymax | $f_{Ymax}(\theta y, \theta z)$ |

θz = 0°

θz = 15°

θz = 30°

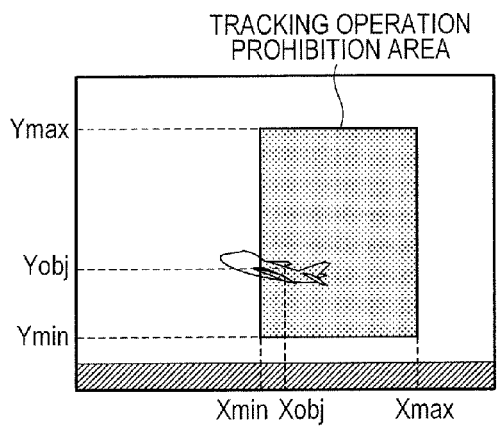

FIG. 14A
TRACKING OPERATION PROHIBITION AREA

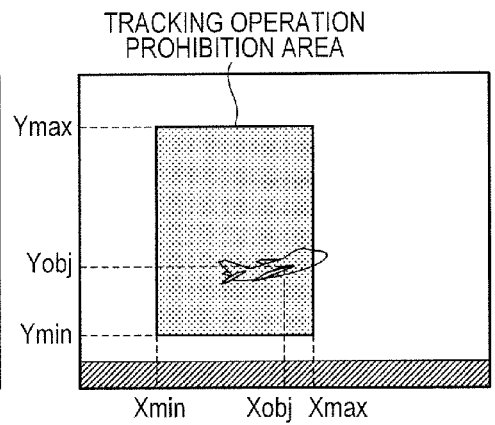

FIG. 14B
TRACKING OPERATION PROHIBITION AREA

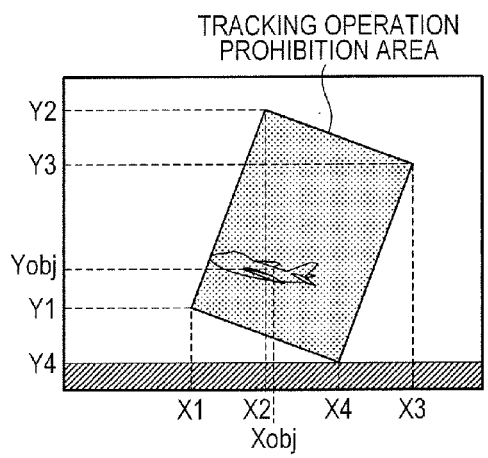

FIG. 14C
TRACKING OPERATION PROHIBITION AREA

FIG. 15

| Ntemp | TRACKING OPERATION PROHIBITION AREA INFORMATION |
|---|---|
| 1 | X1min = $f_{X1min}$ (Zpt, Tpt, Ppt)<br>X1max = $f_{X1max}$ (Zpt, Tpt, Ppt)<br>Y1min = $f_{Y1min}$ (Zpt, Tpt, Ppt)<br>Y1max = $f_{Y1max}$ (Zpt, Tpt, Ppt) |
| 2 | X2min = $f_{X2min}$ (Zpt, Tpt, Ppt)<br>X2max = $f_{X2max}$ (Zpt, Tpt, Ppt)<br>Y2min = $f_{Y2min}$ (Zpt, Tpt, Ppt)<br>Y2max = $f_{Y2max}$ (Zpt, Tpt, Ppt) |

AUTOMATIC TRACKING APPARATUS

BACKGROUND OF THE INVENTION

Field of the Invention

The present invention relates to an automatic tracking apparatus, and particularly to an automatic tracking apparatus that automatically changes the shooting direction of a camera to automatically track a desired object.

Description of the Related Art

Conventionally, an automatic tracking apparatus has been known that performs zooming, panning and tilting of a camera platform mounted with a television camera to change the angle of view of an image acquired by the camera and the direction of the optical axis direction, thereby automatically tracking a moving object. Here, if the panning or tilting operation is performed when the object moves quiveringly within an image pickup range of the camera, an image with a shaking screen is acquired. To prevent the shake, a method has been known that provides a tracking operation prohibition area in which no tracking operation on the camera platform is performed when an object remains in a certain area.

For instance, Japanese Patent Application Laid-Open No. 2001-169170 discloses an example of changing the range of a tracking operation prohibition area (dead zone) according to the position of an object in a screen. Japanese, Patent Application Laid-Open No. 2002-171438 discloses an example of Changing a tracking operation prohibition area according to the traveling speed of an object.

According to the conventional art disclosed. it Japanese Patent Application Laid-Open No. 2001-169170, when the object moves from the center at high speed, the object gets out of the screen because the dead zone is wide; there is a possibility of losing track of the object. However, if a small dead zone is preset, a phenomenon cannot be prevented in which an image with a shaking screen is acquired when an object quiveringly moves as described above. According to the conventional art disclosed in Japanese Patent Application Laid-Open No. 2002-171438, if the speed of an object abruptly changes, track of the object is sometimes lost.

SUMMARY OF THE INVENTION

The present invention provides an automatic tracking apparatus that prevents a malfunction of losing track of an object owing to the object being out of a screen, prevents a phenomenon in which an image with a shaking screen is acquired when the object quiveringly moves, and performs a tracking operation suitable to situations.

An automatic tracking apparatus of the present invention is an automatic tracking apparatus including an image pickup apparatus having a zoom function and a camera platform driving the image pickup apparatus in at least One of a pan direction and a tilt direction, and automatically tracking an object to be tracked by operating at least one of the image pickup apparatus and the camera platform, the automatic tracking apparatus further including: a unit for detecting a position of the object to be tracked in image information taken by the image pickup apparatus; a prohibition area setting unit for setting a tracking prohibition area, according to information on the automatic tracking apparatus that includes information on the object to be tracked including information on at least one of a type, an orientation and a traveling speed of the object to be tracked, or information on at least one of a pan position and a tilt position of the camera platform and a zoom position of the image pickup apparatus; and a controller that, when the position of the object to be tracked is in the tracking prohibition area, does not perform a tracking operation, and, when the position is out of the tracking prohibition area, performs at least one of zoom, pan and tilt operations to perform the tracking operation.

The present invention can provide an automatic tracking apparatus that prevents a malfunction of losing track of an object owing to the object being out of a screen, prevents a phenomenon in which an image with a shaking screen is acquired when the object quiveringly moves, and performs a tracking operation suitable to situations.

Further features of the present invention will become apparent from the following description of exemplary embodiments with reference to the attached drawings.

BRIEF DESCRIPTION OF THE DRAWINGS

FIG. 6A is an example of a tracking prohibition area in Embodiment 1.

FIG. 6B is an example of a tracking prohibition area in Embodiment 1.

FIG. 7 is an example of a table stored in a memory in Embodiment 1.

FIG. 14A is an example of a tracking prohibition area in Embodiment 2.

FIG. 14B is an example of a tracking prohibition area in Embodiment 2.

FIG. 14C is an example of a tracking prohibition area in Embodiment 2.

FIG. 15 is an example of conditional expressions stored in a memory in Embodiment 3.

DESCRIPTION OF THE EMBODIMENTS

Preferred embodiments of the present invention will now be described in detail in accordance with the accompanying drawings.

Figure 1:
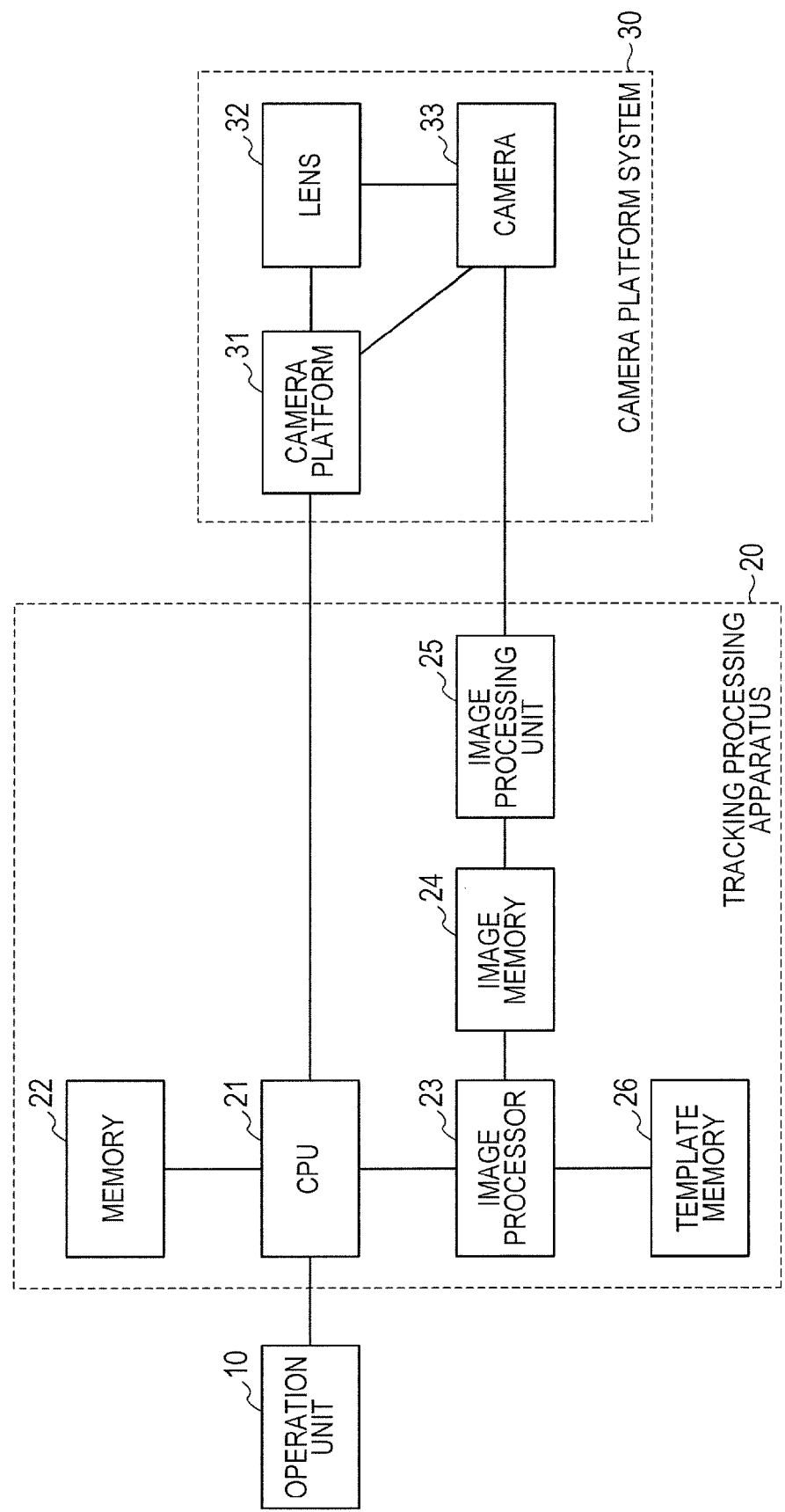
FIG. 1 is a block diagram of Embodiment 1.

Exemplary embodiments of the present invention will hereinafter be described in detail with reference to accompanying drawings. FIG. 1 is a block diagram according to an embodiment of the present invention.

Embodiment 1

Hereinafter, referring to FIG. 1, a configuration according to a first embodiment of the present invention will be described.

An automatic tracking system of this embodiment includes an operation unit 10, a tracking processing apparatus 20 and a camera platform system 30. An operator operates the operation unit 10, and remotely operates the camera platform system 30, thereby an image with a desired angle of view to be acquired. The operation unit 10 and the camera platform system 30 are connected to each other via the tracking processing apparatus 20. During stop of the tracking operation, a signal from the operation unit 10 is sent as it is to the camera platform system 30. In contrast, during automatic tracking, the tracking processing apparatus 20 performs processes for automatic tracking based on an image signal, and sends an appropriate control signal to the camera platform system 30, thereby tracking an object which is to be tracked.

The camera platform system 30 includes a camera platform 31, a lens 32 and a camera 33. The camera platform 31 includes a unit for driving the lens 32 and the camera 33 in at least one of a pan direction and a tilt direction, and a unit for receiving control signals from the operation unit 10 and the tracking processing apparatus 20 and performing determination. If the received signal is a pan and tilt control signal, each motor Is controlled to perform pan and tilt operations. If the signal is a control signal on one of the lens and the Camera, the Control signal is transferred to the corresponding one of the lens 32 and the camera 33. The lens has a zoom function and a focus adjustment function. Upon receiving the control signal from the camera platform 31, this lens performs corresponding zoom and focus operations. Likewise, upon receiving the control signal from the camera platform 31, the camera 33 performs corresponding operations.

The tracking processing apparatus 20 includes a CPU 21, a memory (area setting information storing unit) 22, an image processor 23, an image memory 24, an image processing unit 25 and a template memory (object information storing unit) 26. The image processing unit 25 receives an image signal from the camera 33, converts the signal into an image data on each frame, and stores the data in the image processing memory 24. The image processor 23 reads the image data from the image processing memory 24, then performs processes based on the data (information on an object to be tracked) stored in the template memory 26, and extracts information on an object to be tracked. During stop of the automatic tracking operation, the CPU 21 does not perform any particular process but sends the control signal as it is from the operation unit 10 to the camera platform system 30. In contrast, when the operator performs an operation on the operation unit 10 to start automatic tracking, an automatic tracking start instruction is sent from the operation, unit 10 to the tracking processing apparatus 20, and the CPU 21 starts the automatic tracking operation. During the automatic tracking operation, an operation amount for tracking is calculated based on the information on the object extracted by the image processor 23, and the operation amount is converted into a control signal for the camera platform, which is sent to the camera platform 31. Repetition of these processes automatically tracks the object.

Figure 2:
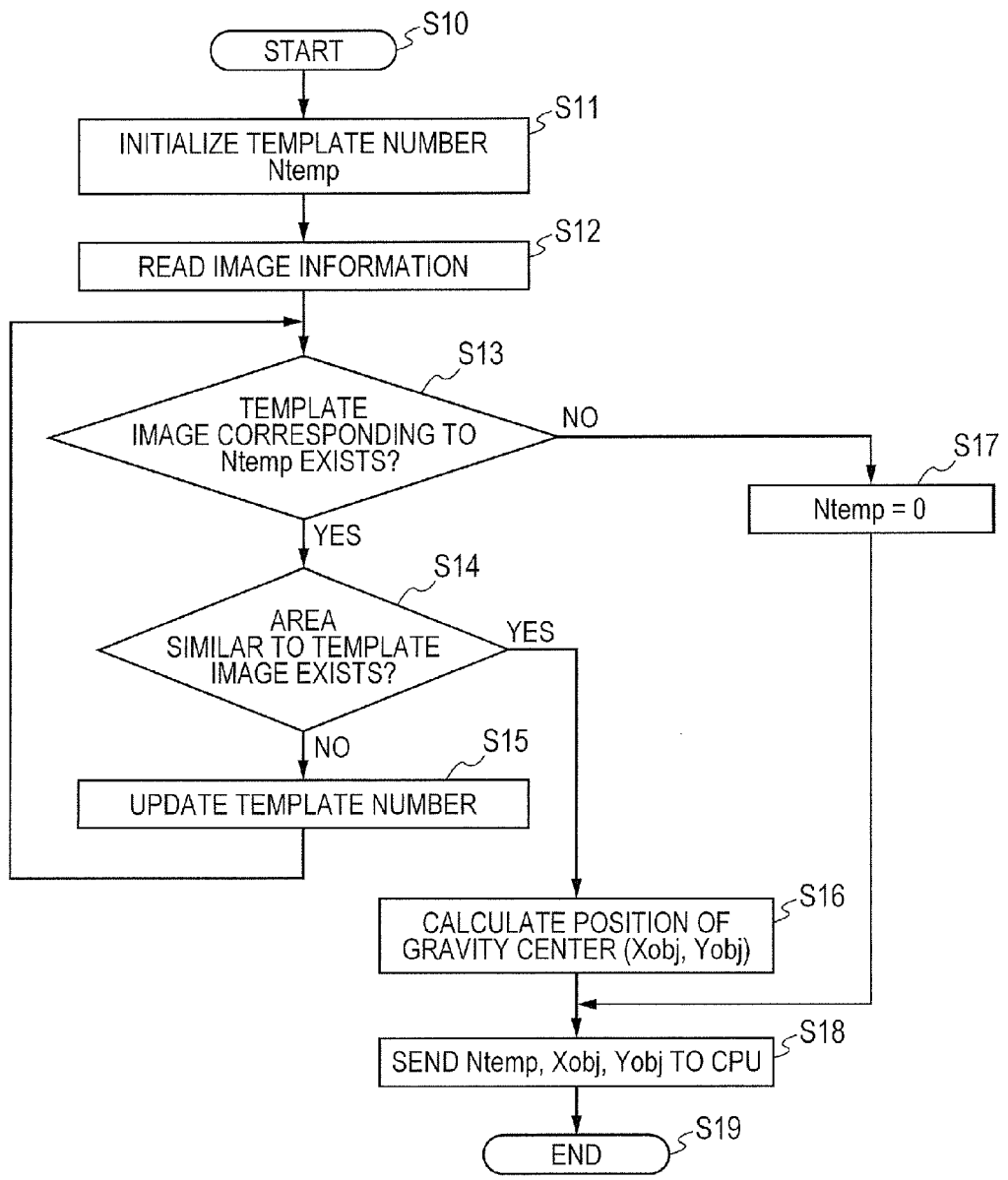
FIG. 2 is a flowchart of processes of an image. processor in Embodiment 1.
Figure 3A:
FIG. 3A is an example of a template image in Embodiment 1.
Figure 3B:
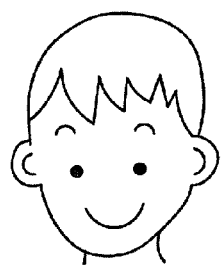
FIG. 3B is an example of a template image in Embodiment 1.

The flow of processes of the image processor will now be described based on a flowchart of FIG. 2. In the template memory 26, two types of images of FIGS. 3A and 3B are preliminarily stored in a state of being associated with respective template numbers Ntemp as Ntemp=1 and Ntemp=2 (information on the type of object to be tracked). Furthermore, in the image memory, images of FIGS. 4A to 4C have been stored by the image processing unit.

Figure 4A:
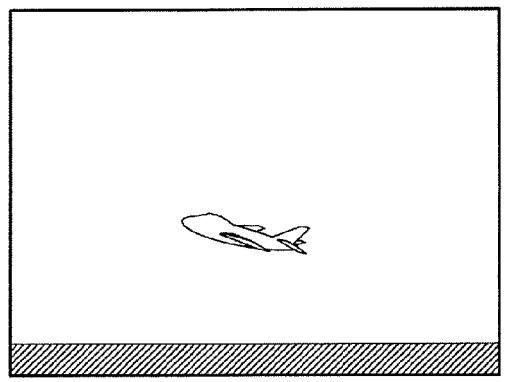
FIG. 4A is an example of an acquired image in Embodiment 1.
Figure 4B:
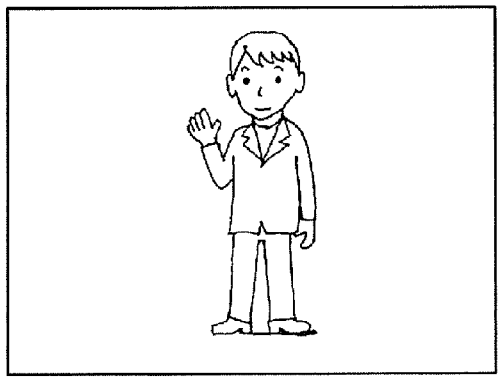
FIG. 4B is an example of an acquired image in Embodiment 1.
Figure 4C:
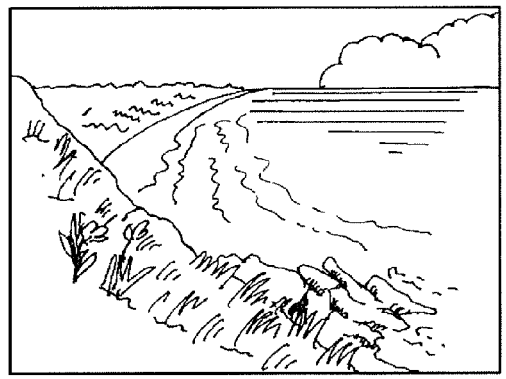
FIG. 4C is an example of an acquired image in Embodiment 1.

First, the image processor 23, which is an object recognition unit (which may be a part of the prohibition area setting unit), sets the template number Ntemp to one for initialization (S11). Image information of FIGS. 4A to 4C stored by the image processing unit from the image memory is read (S12). The template image of FIG. 3A associated with Ntemp is read from the template memory 26 (S13). Next, it is determined as to whether or not a similar area having a high correlation with the template image exists in the image information (S14). In the case where the image, information is of FIG. 4A, an area similar to the template image can be found in the image information, Accordingly, Ntemp is one. Next, to acquire positional information of the object, the position of the gravity center (Xobj, Yobj) of the similar area is calculated (S16). In the case where the image as illustrated in FIG. 4B is stored in the image memory, the image is dissimilar to the template illustrated in FIG. 3A. Accordingly, Ntemp is updated to two (S15). Subsequently, the above processes are performed on the template image of FIG. 3B. Thus, Ntemp is determined to be two, and the position of the gravity center (Xobj, Yobj) is calculated. Meanwhile, in the case where an image as illustrated in FIG. 4C is stored in the image memory, the image is dissimilar to both of the template images stored in the template memory 26. Accordingly, there is no image associated with Ntemp. In this case, Ntemp is set to zero, which indicates a state where no object exists (S17). The template number Ntemp and the position of the gravity center (Xobj, Yobj) of the object calculated by the above processes are sent to the CPU (S18), thereby allowing the image processor to perform processes of determining the object and extracting the information thereof.

Figure 5:
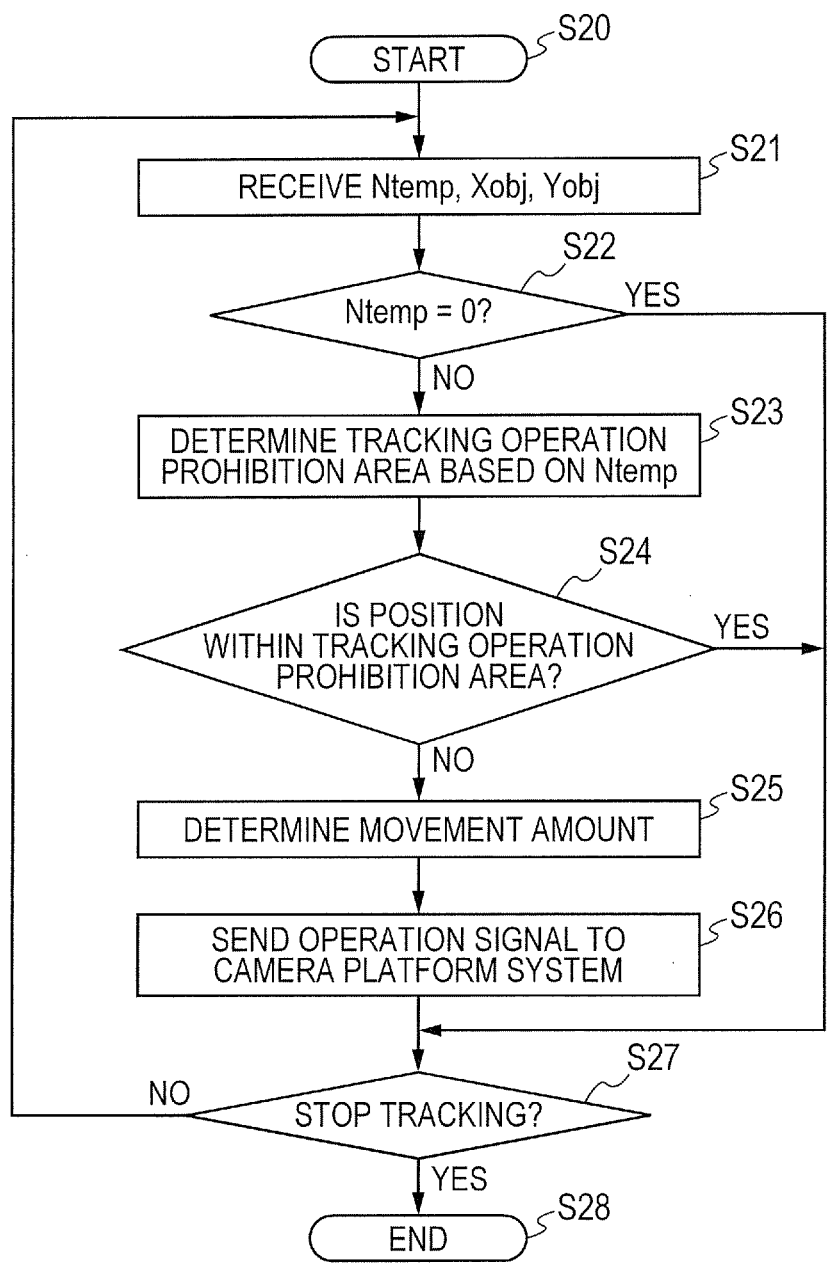
FIG. 5 is a flowchart of processes of a CPU in Embodiment 1.

Next, the flow of processes of CPU in the tracking operation will he described based on a flowchart of FIG. 5, FIG. 6A is predetermined as a tracking prohibition area for a case where Ntemp is one. FIG. 6B is predetermined as a tracking prohibition area for a case where Ntemp is two. In the memory, information of Xmin, Xmax, Ymin and Ymax, which are the minimum values and the maximum values in the x and y coordinates on the screen of the tracking prohibition area are stored as table data associated with Ntemp as illustrated in FIG. 7.

When the tracking operation is started, the CPU receives the template number Ntemp representing the type of the object and the information representing the position of the object (Xobj, Yobj), from the image processor (S21). In the case where no object exists, such as a case where Ntemp is zero as described above, processes thereafter are not executed because the automatic tracking operation on the camera platform is not required (S22). In contrast, in the case where an object exists, the CPU 21, which is a prohibition area setting unit for setting the tracking prohibition area, reads information of the tracking prohibition area stored in association with Ntemp, from the memory, and determines the tracking prohibition area (S23).

Figure 8A:
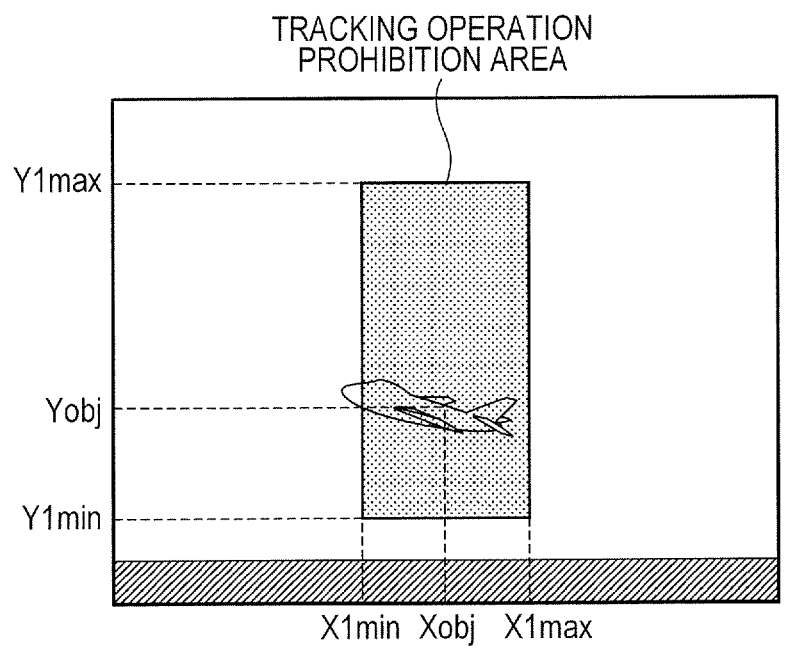
FIG. 8A is an example of an object and a tracking prohibition area in Embodiment 1.
Figure 8B:
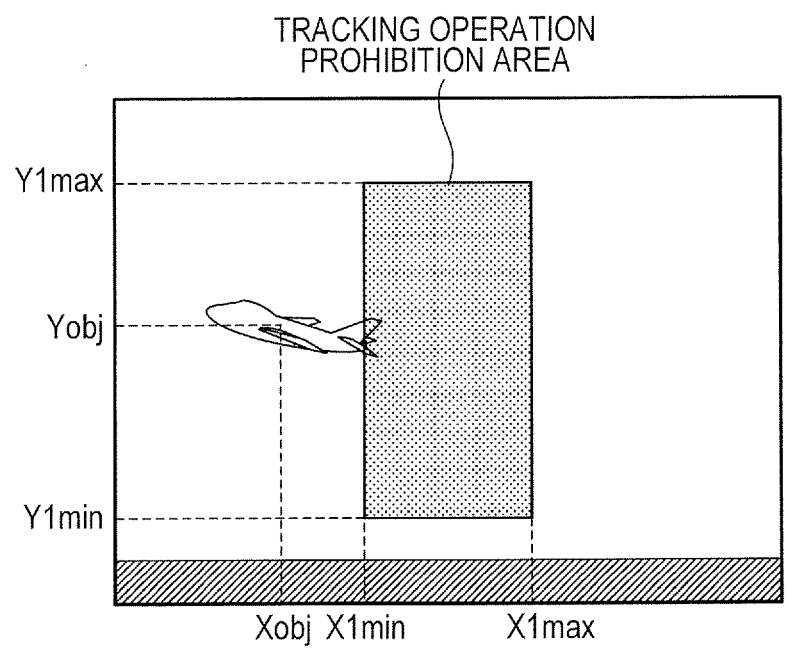
FIG. 8B is an example of the object and a tracking prohibition area in Embodiment 1.

Next, it is determined whether or not the position of the object is in the tracking prohibition area (S24). If X1min<Xobj<X1max in the pan direction as illustrated in FIG. 8A, it is determined that the object is in the tracking prohibition area, and control on the camera platform thereafter is not required. In contrast, if the condition is not satisfied as illustrated in FIG. 8B, the CPU (controller) 21 determines that the object is out of the tracking prohibition area, calculates a difference with a target position where the object is to be located in the tracking prohibition area, and determines the difference as a movement amount of the camera platform in the pan direction (S25). In the area illustrated in FIG. 8B, the target position may be set to X1min at a boundary with the tracking prohibition area, or the center of the tracking prohibition area. A desirable structure can be adopted where the position can be changed according to the speed of the object among values larger than X1min but smaller than the center. That is, the desired target position is according to the speed of the object and between the boundary with the tracking prohibition area nearer the position of the gravity center of the object and the center of the tracking prohibition area.

Subsequently, the CPU (controller) 21 converts the movement amount into an appropriate control command for the camera platform, and sends the command to the camera platform (S26). Analogous processes are also performed in the tilt direction, thereby performing the automatic tracking operation for allowing the object to remain in a certain area of the acquired image. Subsequently, it is determined as to whether or not the tracking operation is finished. In the case of continuing the tracking operation, the above processes are repeated. In contrast, in the case of finishing the tracking operation, such as a case where the operator performs an operation for finishing tracking and a tracking finishing instruction is thereby sent from the operation unit, thereby processing is finished and the state becomes that of waiting for start of the tacking operation (S27).

As described above, the tracking prohibition area is changed according to the similar template number and automatic tracking is performed, thereby allowing automatic tracking according to one or more type of object In a system derived from this embodiment, the tracking processing apparatus may he incorporated as one of a part of the operation unit and a part of the camera platform system. In this embodiment, the image processor and the CPU are configured as separate components. Instead, one CPU may perform the processes.

The template images and data of the respective tracking prohibition areas associated therewith may be preliminarily stored, or arbitrarily registered by the operator on the operation unit.

In this embodiment, the example of the detection method due to template matching is employed as the object detection method. Instead, the method may be one of methods of detection used on color information, detection by moving body detection, detection by comparison of patterns of characteristic points, and a detection method combining these methods.

The positional information may be acquired from the camera platform, and the positional information may be used for the process of detecting the object. For instance, zoom positional information of the lens is acquired from the camera platform, ranges of an enlargement ratio and a reduction ratio of the template image for searching for an area similar to the template image in S14 may be changed according to the zoom positional information.

Embodiment 2

A second embodiment of the present invention will hereinafter be described.

Figures 9, 10:
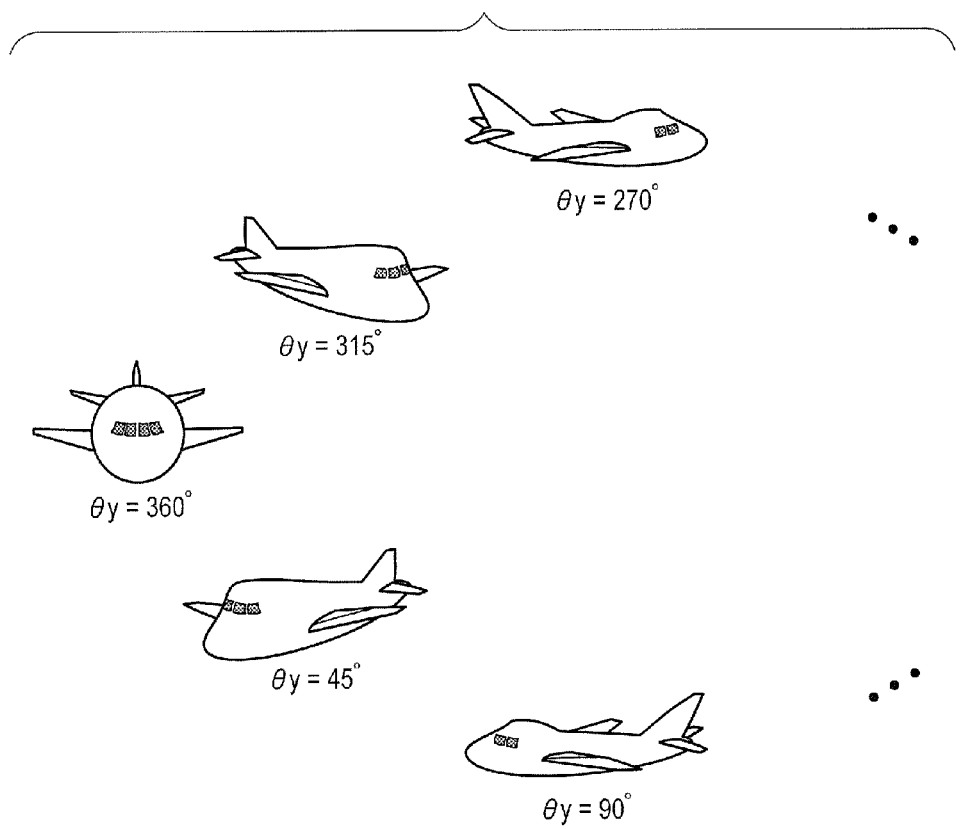
FIG. 9 is an example of template images in Embodiment 2.
FIG. 10 is an example of conditional expressions stored in a memory in Embodiment 2.
Figure 11:
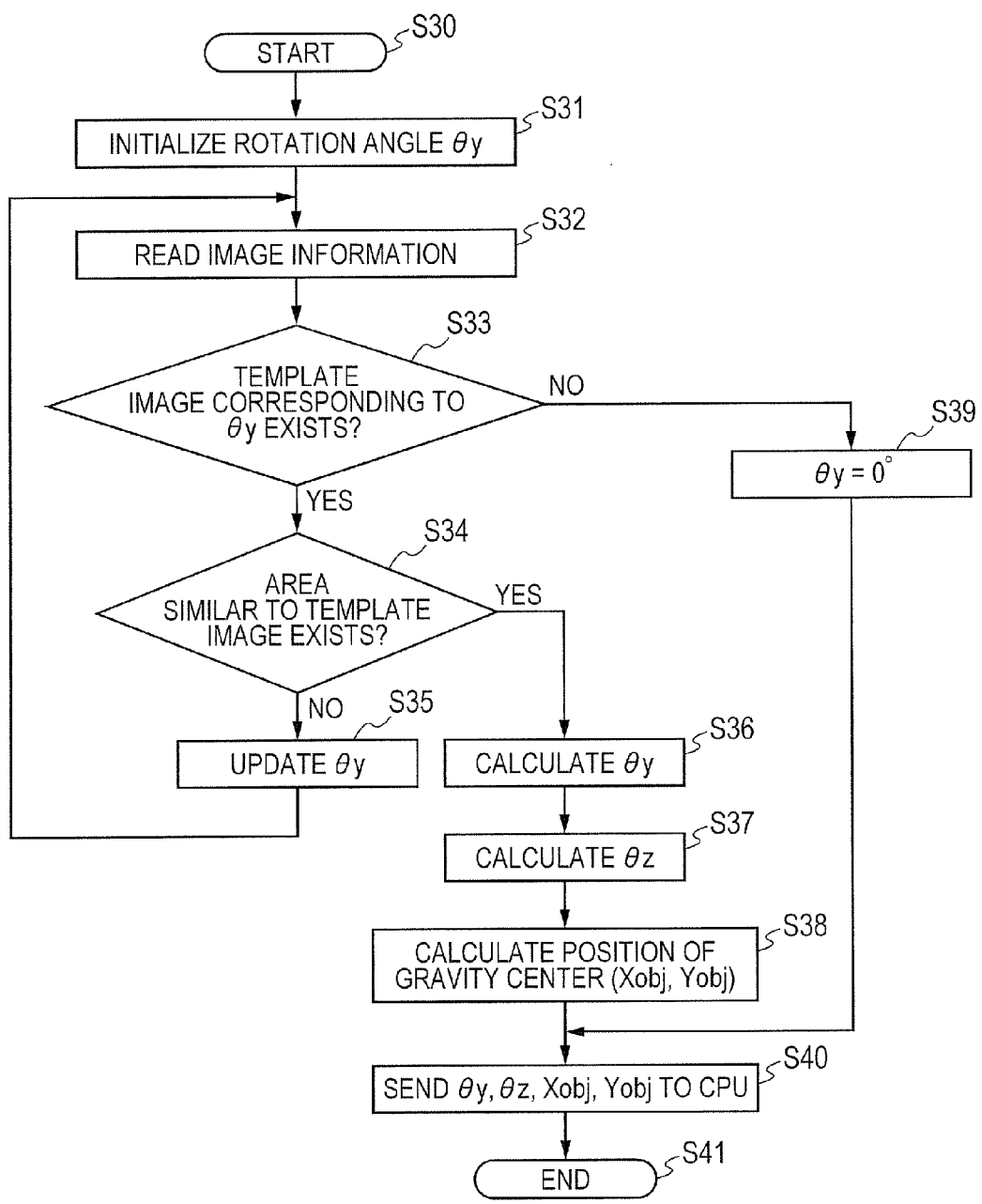
FIG. 11 is a flowchart of processes of an image processor in Embodiment 2.

The configuration is analogous to that of Embodiment 1 illustrated in FIG. 1. Images of the same object are stored in the template memory 26 in association with rotation angle θy about a prescribed axis y were the images are shot in every 45 degrees of the rotation angle respectively as illustrated in FIG. 9. Furthermore, in the memory 22, conditional expressions are stored which uniquely determines the tracking prohibition area according to the rotation angles, θy and θz, of the object on axes in two directions as illustrated in FIG. 10. In this embodiment, two directions defining the respective two rotation angles are the y direction, which is one of the axial direction of pan scanning and the up-and-down direction on the image pickup screen, and the z direction, which is perpendicular to the image pickup screen; rotation angles θy and θz for the respective rotations about y and z axes are exemplified. However, the present invention is not limited thereto. Any two may be employed as the axes, and use of rotation angles on the respective rotation axes can also exert advantageous effects of the present invention. The conditional expression is set such that, even when the speed of the object is abruptly changed and pan and tilt driving for tracking is delayed, the object does not get out of the range of the image pickup screen. That is, in the traveling direction with a possibility of significant change in speed of the object to be tracked (a range of the possible speed in this direction is wide), the distance between the end of the image pickup screen in the traveling direction and the end of the tracking prohibition area in the traveling direction is set large (wide) with respect to the other directions. For instance, if a possibility of change in speed of the object to be tracked in the direction to the left on the screen is significantly higher than that in the other directions, the center of the tracking prohibition area may be set disposed to the right of the center of the image pickup screen. Furthermore, the image information of FIG. 4A is stored in the image memory.

The flow of processes of the image processor in the second embodiment of the present invention will be described based on a flowchart of FIG.

Figure 12A:
FIG. 12A is an example of calculating the angle of an object in Embodiment 2.
Figure 12B:
FIG. 12B is an example of calculating the angle of the object in Embodiment 2.
Figure 12C:
FIG. 12C is an example of calculating the angle of the object in Embodiment 2.

First, the rotation angle θy is set to 45° for initialization (S31). As with Embodiment 1, the image information is read from the image memory (S32), it is determined to whether or not the template image associated with θy is stored in the template memory 26, and, if stored, the image is read (S33). Next, it is determined whether or not an area similar to the template image exists in the image information (S34). If no similar area exists, θy is updated in increments by 45° (S35), and analogous processes are repeated. If an area similar to the template image exists, the image is determined as an object to be tracked, it is determined whether or not an image with a higher correlation among the remaining template images stored in the template memory 26 exits, and the rotation angle θy is calculated (S36). Next, as illustrated in FIGS. 12A to 12C, the rotation angle θz about the z direction having the highest correlation with the object is calculated while the selected template image is rotated about the z direction perpendicular to image pickup screen as the axis (S37). Subsequently, as with Embodiment 1, the position of the gravity center (Xobj, Yobj) of the object is calculated (S38). By contrast, if an image as with FIG. 4C is acquired in the image memory, it is determined that the image is dissimilar to any of the template images stored in the template memory 26, and θy is thereby set to 0°, which indicates that no object exists (S39). The angular information (θy, θz) of the object (information on the orientation of the object to he tracked) and the positional information (Xobj, Yobj) calculated by the above processes are sent to the CPU (S40), and image processor executes processes of recognizing the object and extracting the information thereof.

Figure 13:
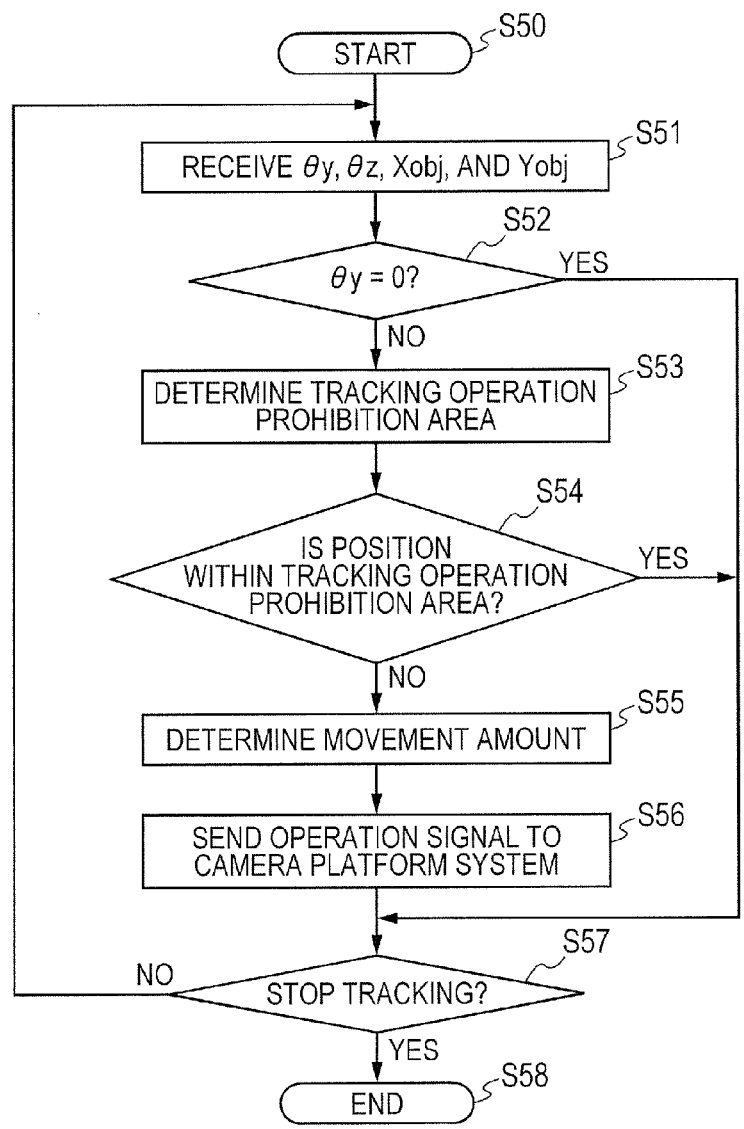
FIG. 13 is a flowchart of processes of a CPU in Embodiment 2.

The flow of processes of the CPU in the tracking operation in the second embodiment of the Present invention will be described based on a flowchart of FIG. 13.

When the tracking operation is started, the CPU receives the angular information θy and θz and the positional information Xobj and Yobj of the object from the image processor (S51). Here, in the case where no object exists such as a case where θy is 0° as described above, the automatic tracking operation on the camera platform is not required and thereby the processes thereafter are not executed (S52). In contrast, if an object exists, the tracking prohibition area is determined based on the conditional expression in FIG. 10 stored in the memory (area setting information storing unit) 22 (S53). Hereinafter, as with Embodiment 1, it is determined whether or not the position is in the tracking prohibition area. If the position is out of the tracking prohibition area, a process of sending an appropriate operation instruction to the camera platform is repeated, thereby performing automatic tracking (S54 to SS7).

As described above, the tracking prohibition area is changed according to the angle of the object, thereby allowing the appropriate tracking operation to be achieved even on the object moving in significantly different manners according to the orientation of the object.

In a system derived from this embodiment, the contents stored in the memory for determining the tracking prohibition area may be the conditional expressions as described above, or have a form of a table associating the tracking prohibition area with the angular information (θy, θz). The tracking prohibition area may have increased pieces of apex information as illustrated in FIG. 14C, or be obliquely disposed according to the angular information. With a certain movement of the object, the area may have any of various shapes, such as ellipses; the shape is not limited to a rectangle.

Embodiment 3

A third embodiment of the present invention will hereinafter be described.

The configuration is analogous to that of Embodiment 1 illustrated in FIG. 1. The CPU 21 receives the positional. information of the current zoom, tilt and pan, from the camera platform system 30. In the memory 22, the conditional expressions uniquely determining the tracking prohibition areas for the respective template numbers Ntemp based on zoom positional information Zpt, tilt positional information and pan positional information Ppt of the current camera platform system 30 as illustrated in FIG. 15 are stored. On an object constantly moving irrespective of the pan and tilt positions, the conditional expression determines a constant tracking prohibition area irrespective of the values Tpt and Ppt. Meanwhile, on an object moving differently according to the pan and tilt positions, the conditional expression determines an appropriate tracking prohibition area according to the values Tpt and Ppt. Weights are thus assigned to the conditional expression. Even when the object moves at the same speed, the size of the tracking prohibition area is changed according to Zpt because, the movement amount on the screen becomes large as the zoom position becomes telephoto side more.

Figure 16:
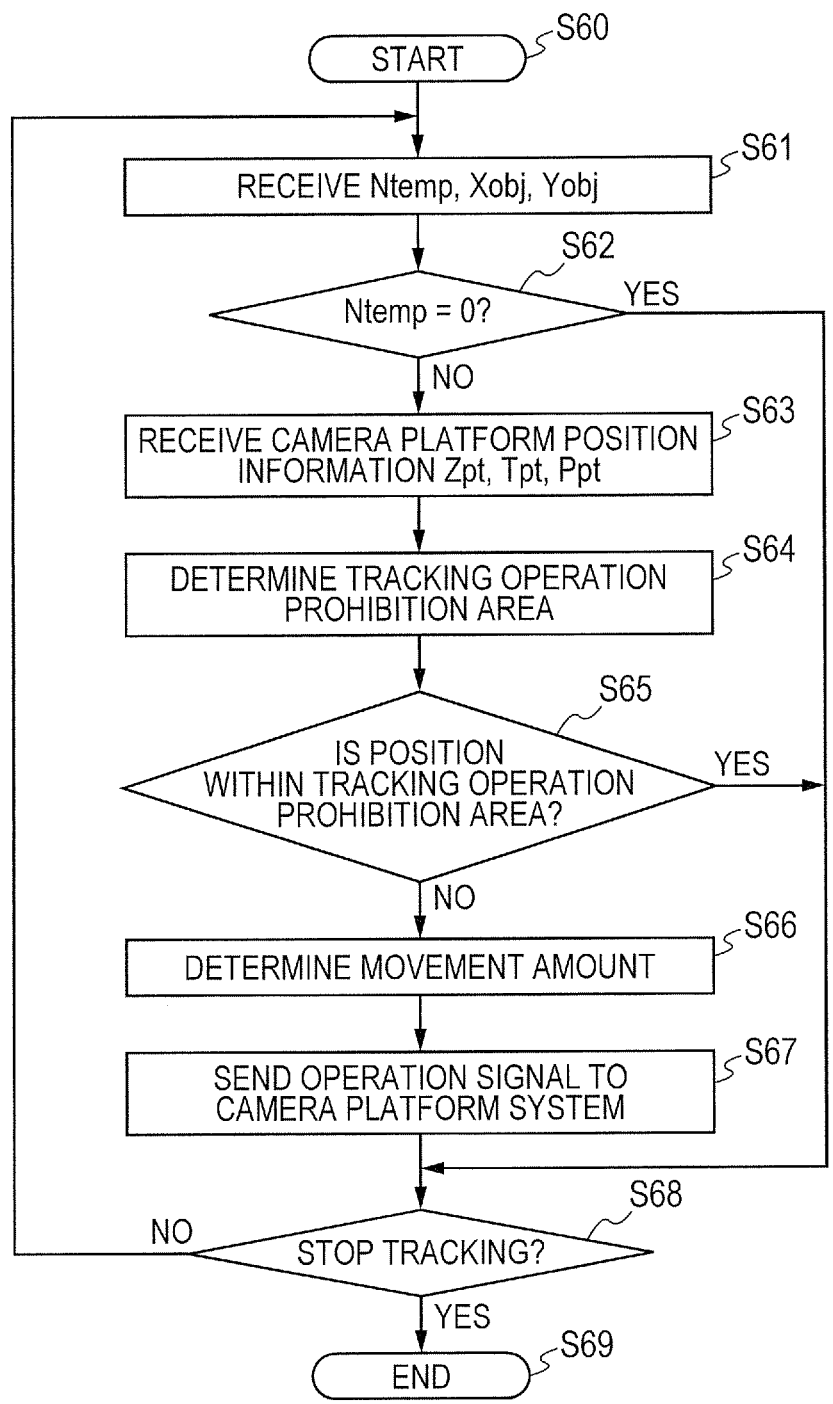
FIG. 16 is a flowchart of processes of a CPU in Embodiment 3.
Figure 17:
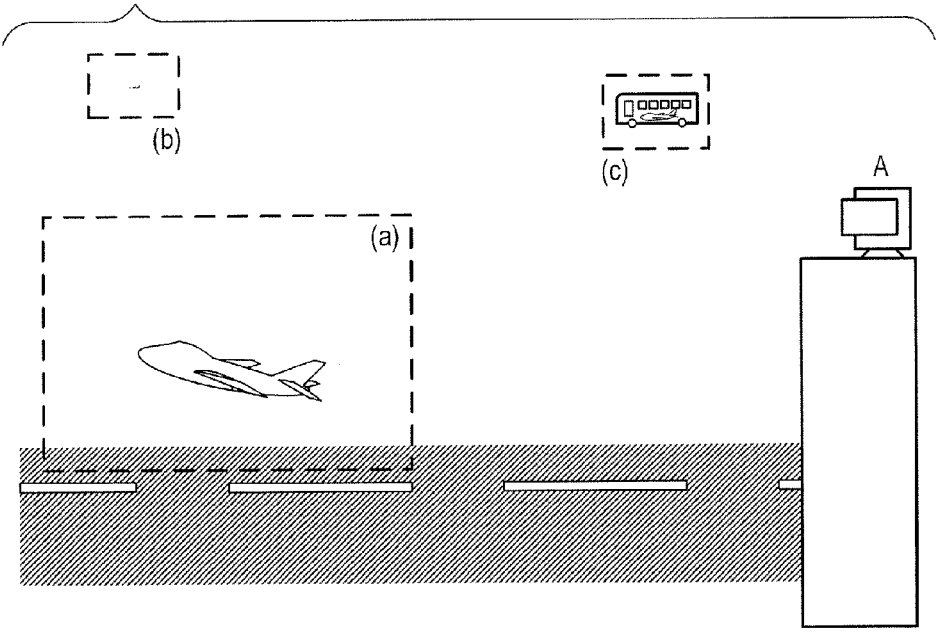
FIG. 17 is an example of installation situations of a camera platform system in Embodiment 3.
Figure 18A:
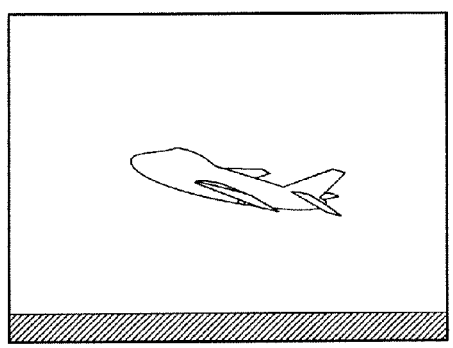
FIG. 18A is an example of an acquired image in Embodiment 3.
Figure 18B:
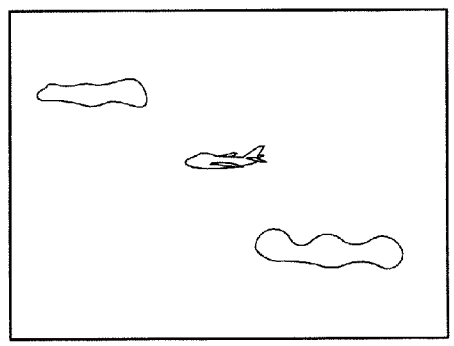
FIG. 18B is an example of an acquired image in Embodiment 3.
Figure 18C:
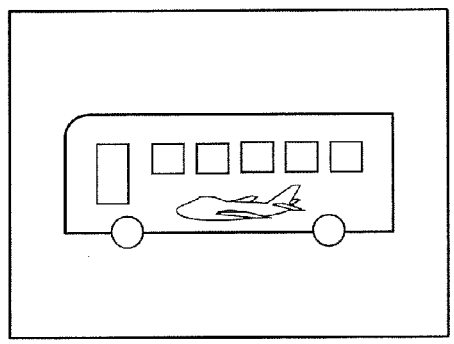
FIG. 18C is an example of an acquired image in Embodiment 3.

The flow of the CPU in the third embodiment of the present invention will be described with reference to a flowchart of FIG. 16. Here, FIG. 17 illustrates the example of an installation environment for the camera platform system 30. FIGS. 18A, 18B and 18C illustrate images at points (a), (b) and (c) taken from the camera platform system 30 installed at an A point.

Figure 19A:
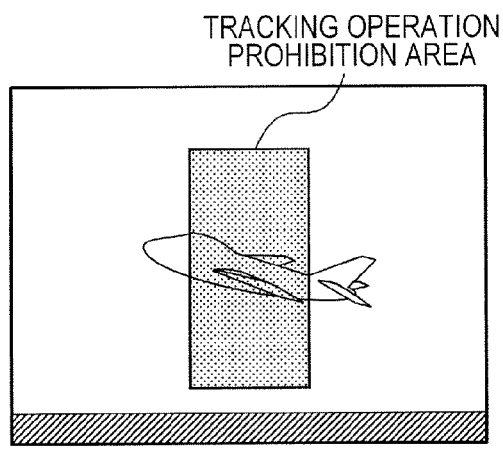
FIG. 19A is an example of a tracking prohibition area in Embodiment 3.
Figure 19B:
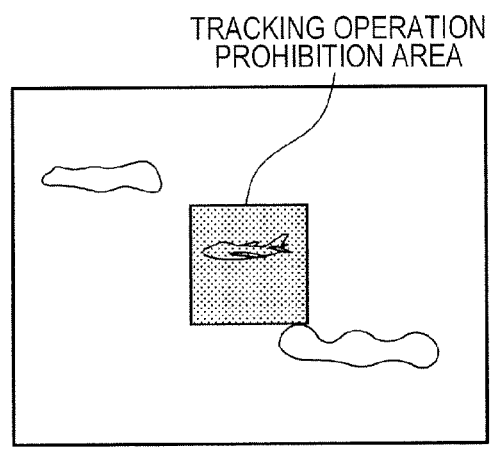
FIG. 19B is an example of a tracking prohibition area in Embodiment 3.
Figure 19C:
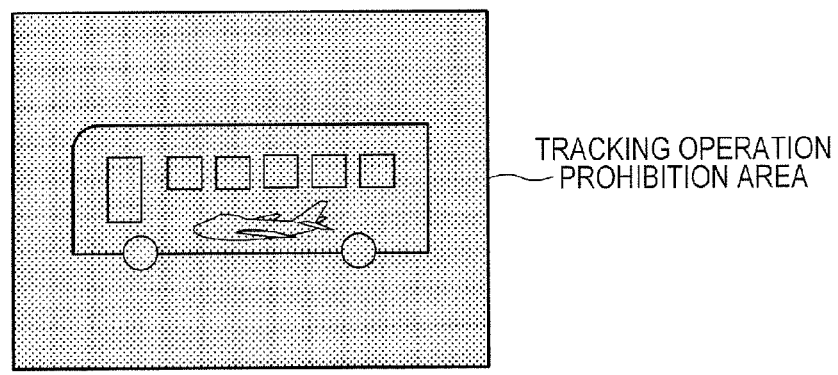
FIG. 19C is an example of a tracking prohibition area in Embodiment 3.

As with Embodiment 1, the template number Ntemp representing the type of the object to be tracked, and the positions (Xobj, Yobj) of the object on the screen are received from the image processor (S61). In the case where no object exists, such as a case where Ntemp is zero, processes thereafter are not executed (S62). Next, current positional information on zoom, tilt and pan (Zpt, Tpt, Ppt) is received from the camera platform (S63). The tracking prohibition area is determined based on the conditional expressions in FIG. 15 stored in the memory (S54). In the case where the acquired image is an image illustrated in FIG. 18A, the tracking prohibition area is set to that as illustrated in FIG. 19A, as with Embodiment 1. In an area where the speed of the object will not abruptly change as illustrated in FIG. 18B, the shape of the tracking prohibition area is changed to a shape, such as that similar to a square, as illustrated in FIG. 19B. In an area where no object to be tracked obviously exists as illustrated in FIG. 18C, the tracking prohibition area is set to match with the screen size as illustrated in FIG. 19C, thereby substantially prohibiting the tracking operation. Hereinafter, as with Embodiment 1, it is determined whether or not the object to be tracked is in the tracking prohibition area. If the object is out of the tracking prohibition area, an appropriate operation instruction is sent to the camera platform, thereby allowing automatic tracking (S65 to S68).

As described above, the tracking prohibition area is changed used on not only the type of the object but also the positional information of the camera platform. Accordingly, false recognition can be prevented, and an appropriate tracking operation can be performed even on the object that moves differently depending on the positions.

Embodiment 4

A fourth embodiment of the present invention will hereinafter be described.

Figure 20:
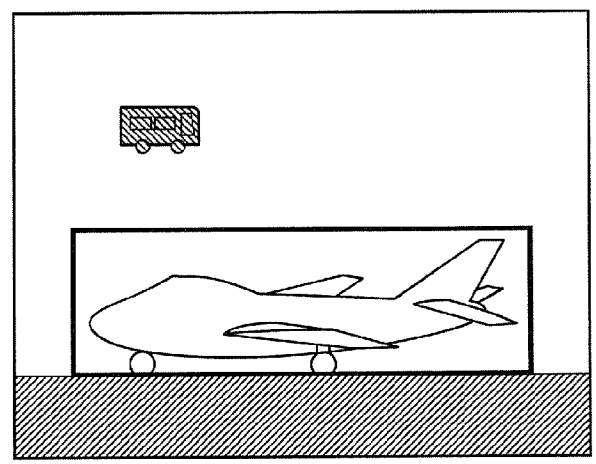
FIG. 20 is an example of an operation screen for determining an object in Embodiment 4.

The configuration is analogous to that of Embodiment 1 illustrated in FIG. 1, As exemplified in FIG. 20, the operation unit 10 includes a unit for selecting a part of an image and selecting the object to be tracked. After the operator determines the object to be tracked, information of the position and the area on the screen is sent from the operation unit 10 to the CPU 21. The CPU 21 sends the information to the image processor 23, which registers the image and number as a new template in the template memory 26. The initial value, as the tracking prohibition area associated with the number, is stored in the memory 22.

Figure 21:
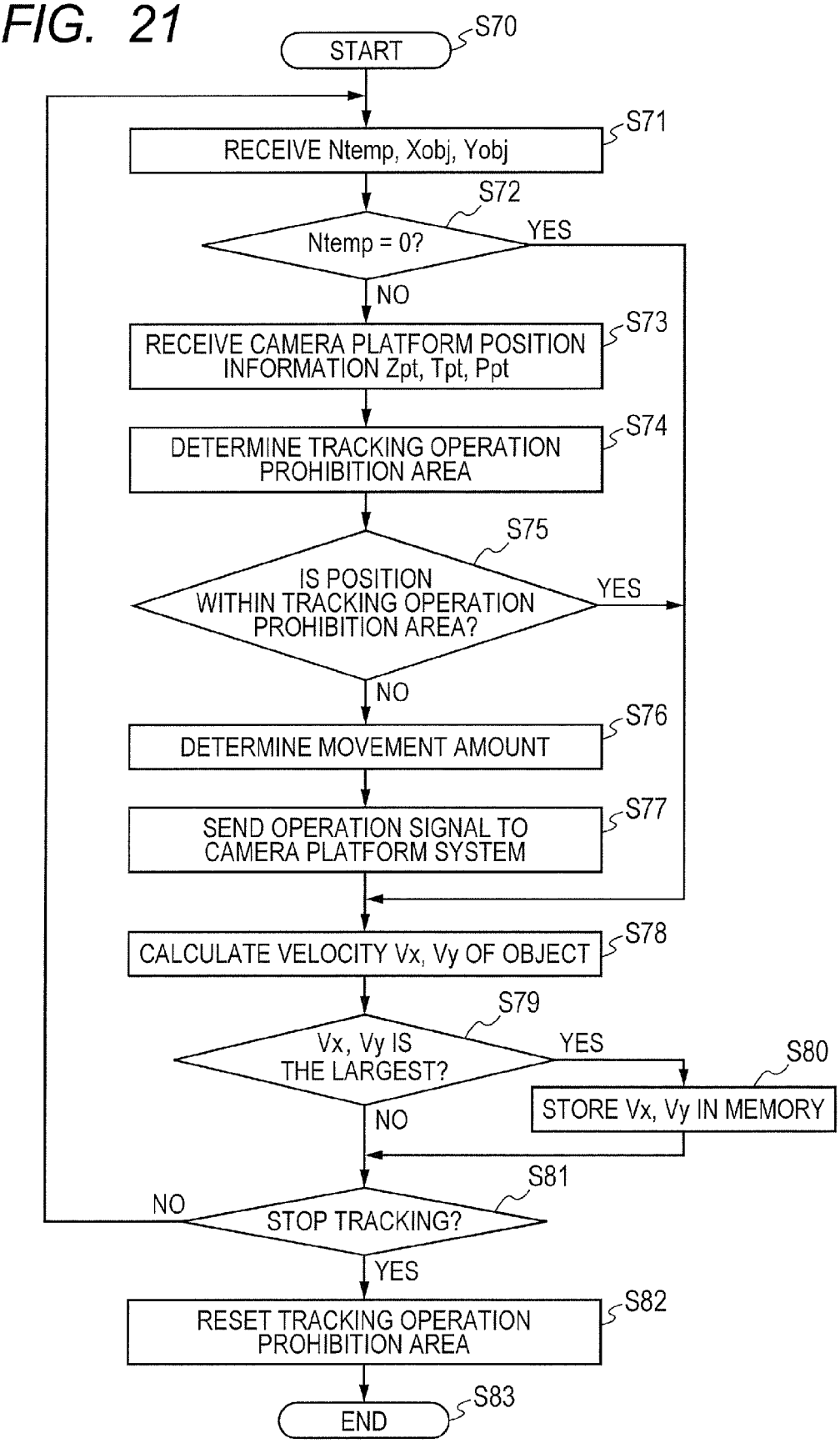
FIG. 21 is a flowchart Of processes of a CPU in Embodiment 4.

The flow of processes of CPU in the tracking operation in the fourth embodiment of the present invention will be described based on a flowchart of FIG. 21.

As with Embodiment 1, when the tracking operation is started, the CPU receives information of the template number Ntemp representing the type of the object to be tracked, and the positions (Xobj, Yobj) of the object on the screen, from the image processor (S71). In the case where no object exists, such as a case where Ntemp is zero, processes thereafter are not executed (S72). Next, the current positional information (Zpt, Tpt, Ppt) is received from the camera platform (S73). Subsequently, the tracking prohibition area is determined; if the object is out of the tracking prohibition area, an appropriate operation instruction is sent to the camera platform, thereby allowing automatic tracking (S74 to S77). Next, the position of the camera platform and the position (Xobj, Yobj) of the object on the screen are compared with the last positional information, and the traveling speed Vx in the horizontal direction of the object and the traveling speed Vy in the vertical direction are calculated from the differences, which are the traveling distance and the elapsed time (S78). The calculated speed (Vx, Vy) of the object is compared with the existing maximum speed stored in the memory. If the speed exceeds the maximum speed, this speed is stored in the memory to update the maximum speed (S80). Subsequently, it is determined whether the tracking operation is finished or not (S81). When the automatic tracking operation is finished, an appropriate tracking prohibition area is calculated based on the maximum speed of the object stored in the memory (S82). According to the above procedures, the information of the tracking prohibition area has been updated on the next tracking.

As described above, update of the tracking prohibition area according to the movement of the object to be tracked enables the tracking prohibition area to be set to that more suitable to the object to be tracked, and allows an appropriate tracking operation according to the object.

In a system derived from this embodiment, the tracking prohibition area may be updated after tracking is finished, or at regular intervals even in tracking. The information for resetting the tracking prohibition area may be based on the maximum speed, or based on the average speed. The tracking prohibition area may be changed according to the position of the camera platform as with Embodiment 3, by storing the speed of the object in association with the positional information of the camera platform.

The exemplary embodiments of the present invention have thus been described above. However, the present invention is not limited to these embodiments. Instead, the present invention can be modified and changed within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese. Patent Application No. 2012-095572, filed Apr. 19, 2012, which is hereby incorporated by reference herein in its entirety.

What is claimed is:

1. An automatic tracking apparatus comprising an image pickup apparatus having a zoom function and a camera platform driving the image pickup apparatus in at least one of a pan direction or a tilt direction, and automatically tracking an object to be tracked by operating at least one of the image pickup apparatus or the camera platform, the automatic tracking apparatus further comprising:
    a unit for detecting a position of the object to be tracked in image information taken by the image pickup apparatus;
    a prohibition area setting unit for setting a tracking prohibition area in a picked up image based on information on the automatic tracking apparatus that includes information on the object to be tracked, including information on at least one of a type, an orientation, or a traveling speed of the object to be tracked, or information on at least one of a pan position of the camera platform, a tilt position of the camera platform, or a zoom position of the image pickup apparatus; and
    a controller that, when the position of the object to be tracked is in the tracking prohibition area, does not perform a tracking operation, and, when the position is out of the tracking prohibition area, performs at least one of zoom, pan, or tilt operations to perform the tracking operation to reposition the object within the tracking prohibition area.

2. The automatic tracking apparatus according to claim 1, further comprising:
    an object information storing unit for storing the information on the object to be tracked,
    wherein the prohibition area setting unit sets the tracking prohibition area according to the type of the object to be tracked determined based on information on the type of the object to be tracked stored in the object information storing unit.

3. The automatic tracking apparatus according to claim 1, further comprising:
    an object information storing unit for storing the information on the object to be tracked,
    wherein the prohibition area setting unit sets the tracking prohibition area according to the orientation of the object to be tracked determined based on information on the orientation of the object to be tracked stored in the object information storing unit.

4. The automatic tracking apparatus according to claim 1, further comprising:
    an object information storing unit for storing the information on the object to be tracked,
    wherein the prohibition area setting unit sets the tracking prohibition area according to the type and the orientation of the object to be tracked determined based on information on the type of the object to be tracked and the orientation of the object to be tracked stored in the object information storing unit.

5. The automatic tracking apparatus according to claim 2, further comprising a unit for additionally registering information on the type of the object to be tracked, in the object information storing unit.

6. The automatic tracking apparatus according to claim 1, further comprising:
    a unit for acquiring positional information of at least one of zoom, tilt, or pan of the camera platform, as information on the camera platform,
    wherein the prohibition area setting unit sets the tracking prohibition area according to the positional information of the camera platform.

7. The automatic tracking apparatus according to claim 1, further comprising:

a unit for calculating the traveling speed of the object to be tracked in the image information, as the information on the object to be tracked, wherein the prohibition area setting unit sets the tracking prohibition area according to the traveling speed of the object to be tracked.

8. The automatic tracking apparatus according to claim 1, further comprising:

an area setting information storing unit for storing information used by the prohibition area setting unit for setting the tracking prohibition area, wherein the prohibition area setting unit sets the tracking prohibition area based on information stored in the area setting information storing unit.

9. The automatic tracking apparatus according to claim 8, further comprising a unit that updates information stored in the area setting information storing unit, and adds information for setting the tracking prohibition area according to the type of a new object to be tracked.

10. The automatic tracking apparatus according to claim 8, wherein the information stored in the area setting information storing unit is information for determining the tracking prohibition area, based on information on at least one of the type of the object to be tracked, the orientation of the object to be tracked, the traveling speed of the object to be tracked, the pan position of the camera platform, the tilt position of the camera platform, or the zoom position of the image pickup apparatus.

* * * * *